United States Patent [19]

Wedlake et al.

[11] Patent Number: 5,061,580

[45] Date of Patent: Oct. 29, 1991

[54] ELECTROCHEMICAL CELL

[75] Inventors: Roger J. Wedlake, Johannesburg; Johan Coetzer, Pretoria, both of South Africa

[73] Assignee: Lilliwyte Societe Anonyme, Luxembourg

[21] Appl. No.: 444,539

[22] Filed: Dec. 1, 1989

[30] Foreign Application Priority Data

Dec. 2, 1988 [GB] United Kingdom ............... 8828230

[51] Int. Cl.$^5$ .......................................... H01M 10/39
[52] U.S. Cl. ................................. 429/103; 429/104; 429/235; 264/57
[58] Field of Search ............... 429/104, 103, 235, 237; 264/57, 66

[56] References Cited

U.S. PATENT DOCUMENTS

| | | | |
|---|---|---|---|
| 4,130,500 | 12/1978 | Melendres et al. | 429/103 X |
| 4,220,691 | 9/1980 | Roth et al. | 429/104 |
| 4,263,381 | 4/1981 | McEntire et al. | |
| 4,348,467 | 9/1982 | Wright | 429/104 X |
| 4,424,262 | 1/1984 | von Alpen et al. | |
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,592,969 | 6/1986 | Coetzer et al. | 429/50 |
| 4,626,483 | 12/1986 | Bones et al. | 429/50 |
| 4,722,875 | 2/1988 | Wright | 429/103 |
| 4,772,449 | 9/1988 | Bones et al. | 419/2 |
| 4,797,332 | 1/1989 | Barrow et al. | 429/104 |
| 4,797,333 | 1/1989 | Coetzer et al. | 429/103 |

FOREIGN PATENT DOCUMENTS

| | | |
|---|---|---|
| 1421702 | 1/1976 | United Kingdom . |
| 2193837A | 2/1988 | United Kingdom . |
| 2210612A | 6/1989 | United Kingdom . |

OTHER PUBLICATIONS

Seo, et al., "Investigation of High Temperature Battery Systems," Army Electronics Command, Jan. 1974.

Herbert P. Silverman, "Development Program for Solid Electrolyte Batteries—Research Project 127-2—Interim Report," Electric Power Research Institute, 1975.

Primary Examiner—Stephen J. Kalafut
Attorney, Agent, or Firm—Arnold, White & Durkee

[57] ABSTRACT

The invention provides an anode for an electrochemical cell. There is an anode holder containing a molten sodium anode. The holder is a ceramic envelope which is a sodium conductor and the holder has a current collector in contact with the sodium and projection through an opening in the envelope wall. The envelope interior contains a unitary porous solid matrix permeable by and impregnated by sodium. The matrix is bonded to at least part of the inner surface of the wall of the envelope. The invention provides also a holder for the anode which is empty of sodium; and provides an electrochemical cell employing the anode; and it provides a method of making said anode and holder.

28 Claims, 3 Drawing Sheets

ELECTROCHEMICAL CELL

THIS INVENTION relates to an anode for a high temperature rechargeable electrochemical power storage cell. The invention also relates to a rechargeable electrochemical cell in which said anode is coupled via an electrolyte with a cathode; and to a method of making such anode.

According to the invention there is provided an anode for a high temperature rechargeable electrochemical power storage cell, the anode comprising a holder which contains an alkali metal active anode substance which is molten at the operating temperature of the cell for which it is intended, the holder comprising a ceramic envelope having a continuous wall made of a solid electrolyte conductor of ions of the active alkali metal anode substance and the holder having an electronically conductive current collector in contact with the alkali metal and projecting through an opening in the wall of the envelope to the exterior thereof, the interior of the envelope containing a unitary porous matrix which is permeable by and impregnated by the molten alkali metal and which is bonded to at least part of the inner surface of the wall of the envelope.

The envelope may be of flattened shape, having a pair of spaced oppositely outwardly facing major outer faces interconnected by at least one outwardly facing peripheral edge face, the current collector projecting through an edge face of the holder, and being sealed in the opening through which it projects. The major faces may be parallel and may be circular in outline, or may be rectangular, square, hexagonal or triangular in outline for use in cells having a corresponding cross-section to permit close packing of cells (rectangular, triangular or hexagonal close packing) as described hereunder. When the major faces are circular or otherwise curved in outline, the envelope will have a single curved, e.g. cylindrical, edge face; and when the major faces are polygonal in outline, the envelope will have a plurality of edge faces corresponding to the sides of the polygonal outline. The envelope may thus be prismatic in shape, having a cross-section normal to its axis whereby a multiplicity of like anodes can be arranged side-by-side in a close packed arrangement. By prismatic in shape is meant that the envelope has three or more faces parallel to a prism axis which extends between two end faces, which may be the major faces as described above, the faces parallel to the axis being side- or edge faces. When they are of this shape the anodes can be loaded into cells of substantially the same cross-section and the cells can then be packed together, side-by-side, in a close packed arrangement, to save wasted space which would arise e.g. in the case of circular cells packed side-by-side.

The envelope will thus have a shell or wall of said solid electrolyte, enclosing an interior space which holds the alkali metal of the anode. The interior space will, apart from the alkali metal, contain said porous matrix in whose pores the alkali metal of the anode is impregnated; and the holder may in addition comprise at least one (and typically several) reinforcing or structural element in the interior of the envelope in contact with and spacing apart portions of the envelope, whereby the envelope is reinforced. The reinforcing elements may act as spacers or buffers in said interior. As the wall or shell in use acts in a cell as a separator and conductor of sodium ions, it is generally as thin as is practicable.

The porous matrix in the interior of the envelope may be of an insulating material such as alpha-alumina, it may be of an ionically conducting material such as the solid electrolyte of the wall or shell of the holder, or it may be of an electronically conducting material; and combinations of these materials may be employed. The matrix material must however be chemically and electrochemically compatible with both the alkali metal and with the material of the wall or shell of the envelope; it must be capable of becoming integrally bonded with the material of the wall or shell by sintering; its coefficient of thermal expansion must be sufficiently similar to that of the wall or shell for the envelope to withstand thermal cycling; and it must preferably shrink to a degree similar to any shrinkage of the wall or shell upon any firing to which it is subjected as described hereunder, to resist undue stressing of the shell or wall during such firing. Any said reinforcing elements may similarly be in the form insulating or conducting (ionically or electronically) materials, being typically the fully dense forms of such materials, and combinations of the aforegoing materials may be employed Similar considerations apply to the structural elements as apply to the matrix, as regards compatibility, bonding to the wall or shell, coefficient of internal expansion and shrinkage upon any firing thereof.

The inner surface of at least the major faces of the wall or shell of the envelope should preferably be fully wetted by the alkali metal at all times. At least part of the inner surface of the envelope may thus be lined by a lining of wicking material, such as a felt or layer of easily wettable wicking fibres or particles for wicking the sodium into contact with said inner surface. This layer will typically be integral with the matrix and bonded to the wall or shell, and similar considerations again apply to the lining regarding bonding thereof to the wall or shell and to the matrix, regarding compatibility with the alkali metal, wall or shell and with the matrix, regarding coefficient of thermal expansion and regarding shrinkage upon firing. This lining may be provided by having the matrix of graduated porosity, fine porosity being provided at and adjacent the wall or shell to form the wicking lining, and coarser porosity being provided elsewhere, remote from the wall or shell. When the lining is e.g. a woven layer of wettable fibres having an open weave, it need not however be bonded directly to either the wall or shell of the envelope, or to the matrix, and the matrix can instead be bonded to the wall or shall via openings in the lining, so that this bonding holds the lining against the inner surface of said wall or shell. Furthermore, wettability of the inner surface of the wall or shell can be promoted by surface treatment of said inner surface, e.g. by doping said surface and/or wicking material with a transition metal oxide as described in published British Patent Application 2195329A. Such wetting can also be promoted by the provision, in the alkali metal of the anode, one or more suitable getters such as Ti, Al or Mg, e.g. as described in published British Patent Application 2193837A, for gettering impurities in the alkali metal such as oxygen, water, hydronium ions etc, which can interfere with good wetting of said inner surface of the wall or shell by the alkali metal.

The current collector may comprise a metal rod, wire or post, projecting through a hermetically sealed opening in the wall or shell of the envelope, and preferably it is constructed to avoid current concentration. The current collector may thus comprise an electrolyte-permeable layer lining at least part of the inner surface of the envelope, being e.g. in the form of a metal mesh, gauze or grid connected to said rod or post, the mesh, gauze or grid conveniently being held by the matrix material or lining, face to face against the inner surface of the wall or shell of the envelope, preferably tightly, so that it is in contact therewith at a multiplicity of positions dispersed evenly over said surface. This current collector layer can thus be embedded in any wicking material which lines said surface, and bonded to the wall or shell by wicking material or matrix material which penetrates through the layer into contact with said inner surface.

As regards current collection and wicking, it should be noted that the porous matrix material in the interior space of the holder can perform a wicking function as indicated above, and can also perform a current collecting function if it is electronically conductive.

The anode may be made in its charged state, loaded with alkali metal, and the interior of the envelope may form at least part of an enclosure which contains an inert gas such as argon at a suitable pressure, which may be sub-atmospheric, to permit some overcharging. Instead, the anode may be made in its discharged state, containing only a small starting amount of alkali metal, or indeed empty of alkali metal, in which case it merely comprises the holder. In this case the envelope may also form part of an enclosure which contains inert gas at a suitable sub-atmospheric pressure. Instead, when it is empty of alkali metal, the envelope may contain oxygen, in which case, during the first charge cycle and as alkali metal enters the holder through the wall or shell, a small proportion of the alkali metal will react with the oxygen thereby creating a vacuum in the holder together with a negligible amount of alkali metal oxide reaction product which is harmless in the anode environment.

In a particular construction, the current collector, where it passes through the wall of the envelope may be hollow and tubular, the anode including an external closed storage reservoir for molten alkali metal anode substance, the reservoir being separate from the envelope and connected to and in communication with the interior of the envelope via the current collector. In this case the envelope will in use be filled with alkali metal at all times, and in use the sodium in the tube will act as a current collector, the volume and level of alkali metal in the reservoir changing as a cell of which the anode forms part is charged and discharged. Conveniently, in use in a cell, the reservoir is located above the envelope; and the reservoir may be hermetically sealed apart from its communication with the envelope, so that, together with the envelope, the reservoir forms an enclosure, optionally containing an inert gas such as argon at a suitable pressure In this case the interior of the envelope can be very thin, and the reinforcement provided by the matrix to the envelope and added strength arising therefrom is particularly beneficial.

When the anode includes a reservoir, then in addition to having the wall of shell of the envelope as thin as possible consistent with adequate strength and durability, the interior space of the envelope, when it is of flattened construction, should also be as thin as possible, (e.g. at most 20 mm thick and preferably at most 3 mm thick), consistent with strength and durability. Thus in a flattened envelope, the spacing between the parts of the wall which provide the major faces of the envelope, should be as small as possible so that the envelope is as thin as possible. In this construction, the major faces of the holder may also, as described above, have a square, rectangular, circular, hexagonal or the like cross-section as described above, and the holder and reservoir together preferably also have a common outline, e.g. rectangular, which permits cells of a corresponding cross-section to be close-packed side-by-side.

When the anode is made in a discharged state in which it is empty of alkali metal or contains only a small starting amount thereof, it can be charged with alkali metal by subjecting it to a charge cycle in an electrochemical cell in which it is located, as the anode, coupled via an electrolyte with a suitable cathode or coupled with a catholyte, provided there is an anode current collector in the holder in contact with the interior surface of the wall or shell of the holder. The cathode or catholyte, as the case may be, should preferably be in a fully discharged or overdischarged state; and the cathode will typically be coupled with the anode via a suitable liquid electrolyte. In this case the envelope acts as the cell anode compartment, and it can be charged with alkali metal as described, for example, in U.S. Pat. No. 4,529,676 or published British Patent Application 2191332A, which respectively describe loading a cell of the type in question in the form of a cell precursor equivalent to the cell in its discharged or overdischarged state, and forming the cell by charging to the fully charged state.

Usually the alkali metal of the anode will be sodium, the solid electrolyte material of the envelope being selected from the group consisting of beta-alumina, beta"-alumina and nasicon. In the description which follows, emphasis will thus be placed on the use of sodium and particularly beta"-alumina for the active anode substance and envelope material respectively, but it will be appreciated that other alkali metals and conductors of the ions thereof can in principle be employed analogously.

It will be appreciated from the aforegoing that the anode of the present cell, when in its fully discharge state and empty of alkali metal, is in fact constituted merely by the holder.

Accordingly, a further aspect of the invention provides a holder for an anode as described above, the holder comprising a ceramic envelope having a continuous wall made of a solid electrolyte conductor of alkali metal ions and the holder having an electronically conductive current collector projecting through an opening in the wall of the envelope so that it leads from the interior of the envelope to the exterior thereof, the interior of the envelope containing a unitary porous matrix which is permeable by and impregnatable by molten alkali metal, the matrix being bonded to at least part of the inner surface of the wall of the envelope.

Apart from the absence of alkali metal, the holder may be as described above with reference to the anode, and in particular it may, together with a reservoir as described above, form part of an enclosure.

According to another aspect of the invention there is provided a high temperature rechargeable electrochemical power storage cell which comprises an anode as described above, and a cell housing having an interior defining a cathode compartment in which the anode is located, an active cathode substance being located in the cathode compartment outside the envelope and electrochemically coupled to the anode.

There may be a plurality of anodes in the cell, connected in parallel and located in the cathode compartment.

The active cathode substance may be provided by a catholyte, electrochemically coupled to each anode, which catholyte is liquid at the cell operating temperature.

For example, e.g. when the cell is a sodium/sulphur cell, the anode active alkali metal substance will be sodium, the catholyte being sulphur, sodium sulphide and/or one or more sodium polysulphides. In this case the cell may have a plurality of anodes as described above, of flattened construction and arranged in a single housing in face-to-face relationship in a spaced series, but electrically connected in parallel, the holders being immersed in a common bath of sulphur/sodium sulphide/polysulphide which forms a common catholyte. This type of cell has the advantage that there is essentially only a single cathode compartment which requires sealing, which sealing can be complex and expensive owing to the high vapour pressures of sulphur/sodium and sulphide/polysulphide at the operating temperatures of such cells. Each anode has an envelope which provides a separate anode compartment which is sealed when it is made, and does not require particular or individual sealing off from the cathode compartment. Furthermore, by using relatively thin envelopes of flattened construction with relatively thin interior spaces between the parts of the envelope walls, which provide their major faces, and by having the envelopes closely spaced, the capacity of the cell relative to the surface area (in units of $Ah/cm^2$) of the envelopes, which provide the cell's solid-electrolyte separator area, can easily be kept low, thereby facilitating high discharge rates, i.e. high values can be obtained for $mA/cm^2$ over the full charge/discharge cycle.

Instead, the active cathode substance may be in solid form, being electrochemically coupled to each anode by a liquid electrolyte in the cathode compartment; and the cell may have a cathode which is in the form of an electronically conductive unitary continuous matrix or artifact which is porous and electrolyte-permeable and is impregnated with the liquid electrolyte whereby the cathode is coupled with the anode, the electrolyte containing cations of the active anode alkali metal and halide anions, and an electrochemically active cathode substance being dispersed in the porous interior of the matrix, the liquid electrolyte being selected so that the active cathode material is substantially insoluble therein. In this case, with flattened anode envelopes and with cathode matrixes of flattened construction and of the same outline as the anode holders, a plurality of anodes and cathode matrixes can be arranged in face-to-face relationship in series, alternating with one another, the anodes being connected electrically in parallel and the cathode matrix artifacts being connected in parallel, all the anode envelopes and cathode matrix artifacts being immersed in a common liquid electrolyte and contained in a common housing which forms a cathode compartment, the envelopes forming separate anode compartments. If desired, however, the housing may be divided into chambers by insulating liquid-tight partitions, each chamber forming a separate cathode compartment and having a single anode therein, with a pair of cathode matrix artifacts on opposite sides thereof and connected in parallel. Each chamber will thus contain a cell and these cells may then be connected in any desired series, parallel or series/parallel relationship, so that the housing as a whole in fact contains a battery of cells. In these constructions, as well, by the use of thin flattened envelopes of thin-walled construction with thin interior spaces, together with major faces of large area and cathode matrix artifacts which are correspondingly thin and have large major faces, low capacity/separator area values ($Ah/cm^2$) can be obtained, promoting high discharge rates, rapid discharge and high values for $mA/cm^2$ over the full charge/discharge cycle of each cell.

Suitable cathodes for cells of the present invention and methods of making them, i.e. those comprising an electronically conductive matrix having an electrochemically active cathode substance dispersed therein and impregnated with liquid, electrolyte, are described e.g. in U.S. Pat. Nos. 4,546,055, 4,529,696, 4,560,627, 4,592,969, 4,626,483, 4,722,875 and 4,772,449, and in published British Patent Application 2191332A. These prior art references also describe suitable solid electrolyte separator materials for the anode holder and, as indicated above, various optional features for the molten alkali metal anodes.

In particular, the cathode matrix may be a transition metal such as porous iron, nickel, chromium, cobalt or manganese and the active cathode substance may be $FeCl_2$, $NiCl_2$, $CrCl_2$, $CoCl_2$ or $MnCl_2$.

As the liquid electrolyte, an electrolyte of the type $MAlHal_4$, in which M is an alkali metal and Hal is a halogen will usually be used, e.g. $NaAlCl_4$. In these electrolytes the molar proportion of Al ions should preferably not exceed the molar proportion of alkali metal ions, i.e. the molar ratio of Al:M should preferably not be greater than 1:1. This can be achieved by ensuring that the cathode compartment contains a proportion of solid alkali metal halide (MHal) in contact with the liquid electrolyte during all states of charge of the cell.

With regard to electrolytes of the $MAlHal_4$ type, such as $NaAlCl_4$, it is a particular advantage that, in addition to providing for substantial insolubility therein of active cathode substances such as $FeCl_2$, $NiCl_2$, $CrCl_2$, $CoCl_2$ or $MnCl_2$ when the Al:M ratio is 1:1, such electrolytes also exhibit their minimum vapour pressure (which is substantially less than that of sulphur/sodium sulphide/polysulphide) when said Al:M ratio is 1:1, at the cell operating temperatures typically encountered. This is important from a constructional and safety point of view, as flat, thin holder walls of e.g. beta"-alumina can be brittle and prone to damage by high electrolyte vapour pressures, particularly during temperature excursions caused e.g. by cell malfunctions. Furthermore, such electrolytes impose relatively gentle freeze/thaw stresses on the holder walls; and a further feature of such electrolytes is that the alkali metal and electrolyte react, in the event of separator failure, to form solid reaction products at the temperatures in question, e.g. metallic Al and solid NaCl when Na reacts with $NaAlCl_4$ in which the Al:Na mole ratio is 1:1. All these features permit the use of cells of the present invention employing relatively thin-walled holders with acceptable durability and resistance to separator failure, and acceptable safety, even in the event of separator failure.

Naturally, other suitable liquid electrolytes, e.g. other molten salt electrolytes, may be employed, provided they contain cations of the alkali metal of the anode. Suitable electrolytes will usually contain halide anions such as chloride anions, being both chemically and electronically compatible with the separator and cathode, and being incapable of poisoning the separator or of dissolving the active cathode substance, as such active cathode substances when in solution in the electrolyte are usually capable of poisoning the separator.

In the various patents and patent applications mentioned above, various options are described regarding the microstructure and electrochemical properties of the various features of the cells of the present invention. Thus U.S. Pat. No. 4,546,055 describes the basic cell from which the present invention is derived; U.S. Pat. No. 4,529,676 describes a method of making suitable cathodes for the cell of the present invention from a transition metal-containing matrix and the alkali metal halide discharge reaction product of the cathode, and it describes the possibility of using one or more intermediate refractory hard metal compounds of Fe, Ni, Co, Cr and Mn with at least one non-metal selected from the group comprising carbon, silicon, boron, nitrogen and phosphorous as the active cathode substance in its discharges state, the refractory hard metal compound being halogenated during charging by chlorination; U.S. Pat. No. 4,560,627 describes the use of $Co/CoCl_2$ or $Ni/NiCl_2$ as a cathode substance in parallel with a $Fe/Cl_2$ cathode to protect the $Fe/FeCl_2$ cathode from overcharging; U.S. Pat. No. 4,592,969 describes the use of fluoride anions as a dopant in an $NaAlCl_4$ electrolyte to resist progressive internal resistance rise of the cell with sustained cycling believed to arise possibly from poisoning of a beta-alumina separator by $AlCl_3$ in the electrolyte; U.S. Pat. No. 4,626,483 describes the use of chalcogens such as S or Se as dopants in the liquid electrolyte and/or active cathode substance to resist progressive reduction in cathode capacity with sustained cycling, for $Ni/NiCl_2$ cathodes; U.S. Pat. No. 4,722,875 described a method of making cathodes for cells according to the present invention from discharge reaction products of the cathode in particulate form with electrolyte; U.S. Pat. No. 4,772,449 describes a method of making a cathode suitable for the cells of the present invention by making a transition metal (Fe, Ni, Cr, Co or Mn) cathode matrix with sodium chloride dispersed therein by oxidizing the metal in particulate form followed by reduction thereof; and published British Patent Application 2191332A describes a method of making cathodes suitable for cells of the present invention by charging a cathode precursor comprising alkali metal aluminium halide molten salt electrolyte, alkali metal halide, aluminium and transition metal (Fe, Ni, Cr, Co or Mn).

It will accordingly be appreciated that, as far as the microstructure and electrochemical properties of the various features (anodes, separators, cathodes, etc) of the cells of the present invention are concerned, and methods of making them, a large number of combinations and possibilities are available; as described, for example, in the abovementioned prior patents and patent applications; and combinations of these various options may be employed, where desirable and compatible. However, in each case, the anode structure of the present invention constituted by the holder having the envelope containing the active alkali metal anode substance can provide material advantages.

According to another aspect of the invention there is provided a method of making an anode as described above for an electrochemical cell or a holder for said anode, including the steps of:

pressing at least two portions of the envelope to have shapes whereby said portions can be arranged together to form the envelope, from a powder which, when pressed and then sintered, shrinks to form an integral ceramic solid electrolyte artifact;

arranging the portions together to form an arrangement which provides the envelope, the portions in the arrangement being arranged so that each portion is in contact with at least one other portion to form a pair in which one portion is an inner portion and the other portion is an outer portion which surrounds and embraces an outer periphery of the inner portion;

loading matrix material into the interior of the envelope; and sintering the arrangement to cause the portions to shrink while they are converted into integral solid ceramic artifacts, the inner and outer portion of each pair being made so that the outer portion of the pair undergoes a greater degree of shrinkage during sintering than the associated inner portion, and shrinks on to the periphery of the inner portion which it embraces, to cause said inner and outer portions to seal together hermetically to form an integral ceramic envelope, and to cause the matrix material to become bonded to at least part of the inner surface of the envelope in the form of a unitary porous solid matrix which is permeable to molten alkali metal.

At most three portions may be pressed to have shapes whereby they can be arranged together to form the envelope so that the envelope has a flattened shape, two of the portions comprising panel portions having major faces of the same area and peripheral outline, the portions being arranged so that the panel portions are opposed face-to-face with each other and are spaced from each other, the panel portions providing the envelope with a pair of oppositely outwardly facing major faces.

In this way a laterally flattened holder having an interior space can be formed, the panel portions providing the holder with a pair of major oppositely outwardly facing major faces.

In a simple construction there need only be two portions which may be of circular outline, said two portions each being a panel portion and one of them being an inner portion while the other is an outer portion. In this case the outer portion may have a circumferentially extending peripheral rim projecting normally to the plane of its panel whereby it embraces the outer periphery of the inner portion, said rim enclosing the interior space between the panels. Instead, both the portions may have said rims, that of the outer portion fitting spigot/socket fashion over that of the inner portion to embrace it and close off the periphery of the interior space.

In another simple construction there may be three portions, namely a pair of panel portions of circular outline, which are both inner portions and an annular outer portion which embraces the outer periphery of both inner portions and closes off the interior space between them. Instead, the panel portions may be outer portions, each embracing the annular portion which is an inner portion.

In both of said simple constructions the holder will have a central axis passing through the centres of the panel portions and normal thereto, and shrinkage of the portions by the firing will cause the circumferential peripheries of the panel portions to contract towards said axis. When there are only two portions this shrinkage, which will be greater for the outer portion, will cause the outer portion to shrink sealingly on to the inner portion where it embraces the inner portion. Similarly, when there are three portions, the outer portion or portions will reduce in radius to a greater degree than the outer periphery or peripheries of the inner portion or portions, and will cause sealing shrinkage on to said outer periphery or peripheries.

Naturally, the portions should be pressed (in their unfired or green state) so that the spacing between each outer portion where it embraces an inner portion is small enough for the difference in shrinkage thereof to permit this spacing to be closed and hermetically sealed during firing. It should also be noted that, while the method has been described above with reference to circular panel members, it in principle can be applied equally to panel members and inner and outer members of different peripheral outlines, which may for example be curved or polygonal. In particular it is contemplated that the method can be applied for portions which are regular-polygonal in outline, e.g. square or hexagonal.

Any additional parts of the anode, such as a current collector or wicking material, may be located in position in the envelope, as desired, during or after arrangement of the portions to form the envelope, and before or after sintering, as convenient. Alkali metal will however be charged into the interior space after firing, either through a charging opening (e.g. a hollow current collector) or electrochemically through the wall or shell of the holder, during a charge cycle of a cell of which the holder forms the anode. For example, the parts may be pressed so that, after they are arranged into the form of a holder in the green state, there is an opening to the exterior of the holder. A current collector may then be inserted through this opening after firing, and hermetically sealed in position, or the current collector may be located in place before the firing, and sealed in place by sintering. The matrix material, either as a precursor, e.g. in particulate form, or as a preformed matrix, should however be located in the envelope before sintering, so that the sintering bonds the matrix to the envelope.

As indicated above with respect to the holder and cell of the invention, the active anode metal will usually be sodium, the material of the holder, after firing, being beta-alumina, beta''-alumina or nasicon. The powder from which the portions are pressed may thus be selected so that, upon sintering, the ceramic into which said portions is converted is a member of the group consisting of beta-alumina, beta''-alumina and nasicon.

It is well known that a variety of starting powders, comprising essentially aluminium oxide and the hydrates thereof, can be sintered at temperatures of the order of 1500°-1650° C. to form integral or unitary artifacts comprising essentially beta-alumina, and, if the appropriate amounts of soda and lithia and/or magnesia are added to certain of these powders, artifacts of the preferred form of beta-alumina, namely beta''-alumina, can similarly be obtained. Such starting materials, apart from powders of beta-alumina itself, include alpha-alumina, theta-alumina, boehmite, bayerite, gibbsite, aluminas derived via chemical routes from organometallics etc.

The Applicant has found that certain of these starting materials, when sintered to form beta-alumina after pressing from powder, undergo different degrees of shrinkage, which differences permit the method of the present invention to be carried out. Furthermore, blends of such powders can be employed, which exhibit a degree of shrinkage intermediate the degrees of shrinkage exhibited by the components of the blend. This shrinkage results from a reduction in volume of the starting material upon sintering, and, as the various starting materials have different densities but provide a product, namely beta-alumina, of relatively increased density which is substantially constant regardless of the starting material, they undergo different volume decreases which lead to different degrees of shrinkage of holder portions from powders thereof.

It is accordingly possible to select suitable powders for the inner and outer portions, or such powders can be formed by blending, to exhibit desired different degrees of radial shrinkage upon firing. Suitable heat treatment of powders, e.g. calcination to temperatures of e.g. 900°-1400° C., can also be used, before pressing the portions, to alter the degree of radial shrinkage exhibited upon sintering; and altering the pressure at which the holder portions are pressed from the powders to vary the density of the holder portions before sintering, can also affect the degree of radial shrinkage exhibited. It is thus possible, within limits, to tailor-make the degree of shrinkage exhibited by a holder portion upon sintering, to permit the portions to be pressed, and optionally machined thereafter, to obtain spacings therebetween where sealing is required which permit the method of the present invention to be carried out.

Typically holder portions of the type in question are pressed, e.g. by isostatic pressing, at pressures in the range of about 70–280 MPa (10 000–40 000 psi), using a polyurethane or the like mould or sleeve to contain the powder to be pressed against a die which can be accurately dimensioned and can have a smooth surface of e.g. polished stainless steel. Such dies will form the surfaces of the pressed portions where they are to be sealed together, and it is thus possible to form an outer portion with an inner sealing surface, for sealing to an inner portion and vice versa, of smooth surface finish and dimensions which are accurate within sufficiently small tolerances to promote good sealing. However, if difficulty is encountered in this regard, leading to reduced dimensional accuracy in terms of constant size and surface finish, the invention contemplates the step of machining sealing surfaces on the portions for sealing to each other. Naturally, the sealing surfaces should be machined to be as smooth as possible, but in practice routine experimentation can be employed to determine adequate tolerances for good hermetic seals.

While the spacing between the sealing surfaces of the portions before sintering must naturally be sufficiently low for the difference between the shrinking of the inner portion to cause hermetic sealing, said spacing between the portions where they seal is generally preferably less than 0.1 mm.

Although smaller differences of shrinkage can in principle be employed it is believed that, for good results, the powders from which the inner and outer portions are pressed, are preferably selected so that, upon sintering, the outer portion undergoes a percentage linear reduction in size, measured as a percentage of its shrunken size, which is greater than the percentage linear reduction in size undergone by the inner portion, measured as a percentage of its shrunken size, by a value of at least 1%, i.e. a reduction of n% for the outer portion and a reduction of $(n-1)\%$ for the inner portion; and the numerical value is preferably at least 5%, i.e. a reduction for an outer portion of n% as opposed to a reduction for the inner portion of $(n-5)\%$.

In this regard it should be noted that, probably because at the sintering temperatures the materials are in a more or less plastic state, relatively large differences of the order of 14% (n% and (n−14)% shrinkage respectively) or more in linear reduction of the portions can be accommodated without cracking of the portions. Fine-grained sintered beta-alumina products, such as those derived from certain boehmites, may have an advantage in this respect. Furthermore, the plasticity of the materials in question materially assists in effecting hermetically sealed physical and/or chemical bonds between the portions.

As examples of how the shrinkage characteristics of the inner and outer portions can be varied or selected, it is to be noted that alpha-alumina-derived starting materials exhibit a linear reduction of 14-15% on firing, whereas boehmite-derived starting materials exhibit a reduction of 28-31%, and starting materials derived from a mixture with a boehmite:alpha-alumina mass ratio of 70:30 exhibit a reduction of 24-27,5%. When the boehmite-derived powder is however calcined to a temperature in the range 900°-1400°.C. before pressing, a reduction in linear shrinkage to a value of 19-22% can be obtained.

As regards differences in shrinkage obtainable for the same starting material for the inner and outer portions by altering the powder pressing pressure, it should be noted that these are typically relatively small, and it should be borne in mind that a portion which is pressed at a lower pressure (e.g. an outer portion to provide increased shrinkage thereof) should nevertheless be pressed at a pressure sufficient to provide it with adequate physical properties after sintering. If this pressure is too low, the sintered density of the fired portion can be unacceptably low.

The Applicant has carried out tests using a variety of starting powders, and the tests conducted indicate that any aluminium oxide powders of the type mentioned above can in principle be used for the method, provided that they sinter to form beta-alumina artifacts, and provided that they exhibit a sufficient difference in shrinkage. Adequate sealing can easily be tested by using an ultra-violet fluorescent dye and/or by vacuum testing.

In particularly preferred embodiments of the method, the portions may be formed so that, after they are arranged to form the envelope, the spacing between inner and outer portions of each said pair where they seal together on firing is at most 0.1 mm, and so that, upon firing, each outer portion of a said pair undergoes a percentage linear reduction in size which is greater by at least 1% than the percentage linear reduction in size which each associated inner portion undergoes, based respectively on the shrunken sizes of the portions; and the pressing may be to a pressure of 70-280 MPa, the sintering being to a temperature of 1500°-1650° C.

As far as the porous matrix in the holder is concerned, this can be inserted, as a pre-formed porous artifact, into the envelope when the portions are arranged to form the envelope, before sintering; or the method may comprise the step of, before the sintering, loading the interior of the envelope with a particulate matrix precursor material, which, when sintering to form the integral envelope takes place, forms the unitary porous matrix which is bonded to the envelope. In the former case the artifact will become bonded to the wall of the envelope during the sintering, and in the latter case the powder will sinter to form a unitary porous artifact which simultaneously bonds itself to the wall of the holder.

The invention extends also to an anode and to a holder for such anode, when the holder is made according to the method described herein, and to an electrochemical cell including such anode.

The invention will now be described, by way of example, with reference to the accompanying drawings, in which.

Figure 1:
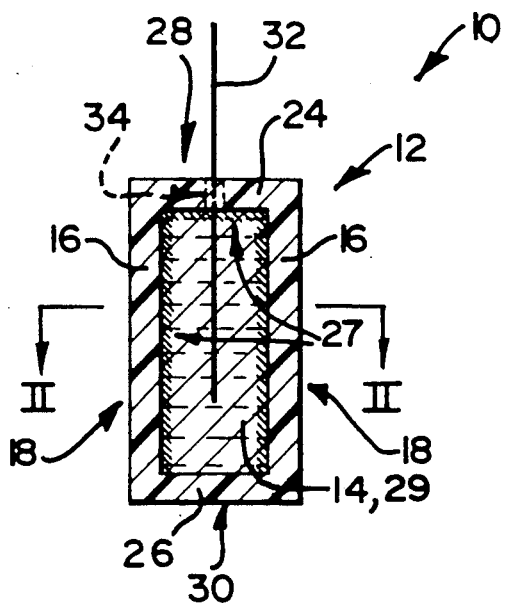
FIG. 1 shows a schematic sectional side elevation of an anode according to the present invention, in the direction of line I—I in FIG. 2.
Figure 2:
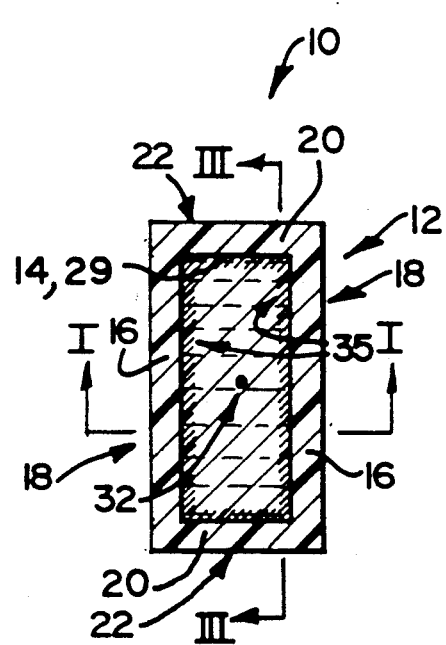
FIG. 2 shows a sectional plan view of the anode of FIG. 1, in the direction of line II—II in FIG. 1.
Figure 3:
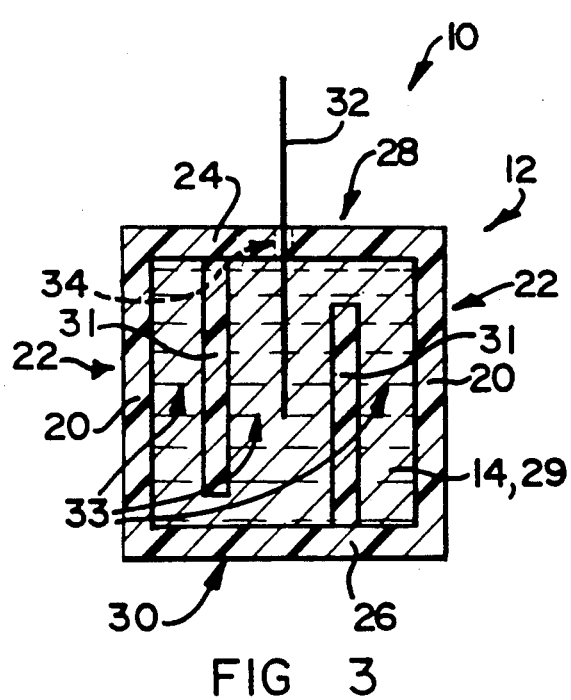
FIG. 3 shows a sectional front view of the anode of FIG. 1, in the direction of line III—III in FIG. 2.

In FIGS. 1 to 3 of the drawings, reference numeral 10 generally designates an anode in accordance with the invention. The anode 10 is in the form of a laterally flattened box-like beta"-alumina holder 12 containing sodium active anode material 14, which is molten at the intended operating temperature of the anode 10. The holder 12 has a pair of major front/rear walls 16 in the form of rectangular panels which are parallel to each other and spaced from each other and present oppositely outwardly facing major faces 18 of the holder. The panels 16 have their peripheral edges interconnected by a pair of side walls 20 which present a pair of oppositely outwardly facing side edge faces 22 of the holder 12; and by an upper wall 24 and a lower wall or floor 26 which respectively represent an upwardly facing edge face 28 and a downwardly facing edge face 30 of the holder 12. The panels 16, side walls 20, upper wall 24 and floor 26 combine to form a flattened envelope which contains the sodium (and the porous matrix material 29 described hereunder).

A wire or metal rod current collector 32 is shown projecting out of the interior of the holder 12, via a sealed opening at 34 in the upper wall 24 of the holder 12.

The anode 10 is shown in its charged state, with the hollow interior of the holder 12 substantially completely filled with sodium 14. The interior of the holder 12, between the panels 16, walls 20 and walls 24, 26, may contain only the current collector 32 as shown, or it may optionally contain various other ancillary current collectors, such as electronically conducting powders, grids, foils, wires, rods or tubes, typically of metal such as a transition metal, which is inert to the sodium 14, said ancillary current collectors being in electronic contact directly or indirectly with the current collector 32. In particular, an electrolyte-permeable grid, mesh, gauze or screen-type current collector may be located as a layer hard up against the inner major surfaces of the panels 16, in contact therewith at a multiplicity of places dispersed over said inner surfaces. This is illustrated by a layer 27 of wicking material in the form of a grid shown in FIG. 1, connected to the current collector 32 and lining the panels 16 and upper wall 24.

Furthermore, the interior of the holder 12 contains a porous material 29 permeable to the sodium 14 in liquid form, and saturated with said sodium in its interior spaces. This porous material is in the form of a unitary porous artifact comprising a matrix, and it is bonded to the wall of the holder. For example, it may be a non-conducting ceramic such as alpha-alumina, an ionically conducting ceramic such as beta- or beta"-alumina, or it may be an electronic conductor. The porous material illustrated is beta"-alumina. Non-porous reinforcing structural elements made e.g. of the above materials can also be provided in the interior spaces of the holder 12, to act for example as baffles, spacers or the like. Two such beta"-alumina reinforcing baffles are illustrated at 31 in FIG. 3, spacing the panels 16 apart and dividing the interior of the holder into three interconnected compartments 33, each containing porous material 29. If desired, combinations of the above non-porous or full density structural elements with particulate material and porous matrixes, which may be powder sinters, can be employed, together with various combinations of current collectors.

The inner surface of the holder 12 should preferably be covered by molten sodium at all times during operation. Accordingly, said inner surface may have a lining of a suitable wicking material 35 (illustrated in FIG. 2) forming part of the porous matrix material described above, but having smaller pores than the remainder of the matrix. Thus a felt of alpha-alumina fibres or flocs may be bonded into the matrix for this purpose. Furthermore, said inner surface of the holder 12 and/or the wicking material may be pretreated by doping it with a material which encourages wetting thereby with liquid sodium, the dopant comprising, for example, a transition metal oxide.

It will be appreciated that, in normal operation, the anode shown in FIGS. 1 to 3 has an upright condition in which its lower wall or floor 26 rests on a horizontal support surface. Furthermore, it will be appreciated that the wall thickness of the container 12 is as thin as possible, consistent with mechanical strength and durability, bearing in mind any reinforcing thereof obtained from the porous matrix or any structural element in its interior.

Figure 4:
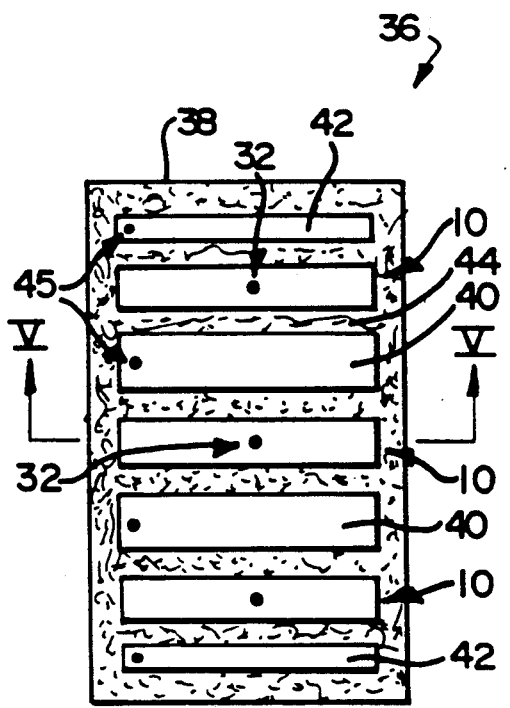
FIG. 4 shows a schematic plan view of a battery in accordance with the present invention, in the direction of line IV—IV in FIG. 5.
Figure 5:
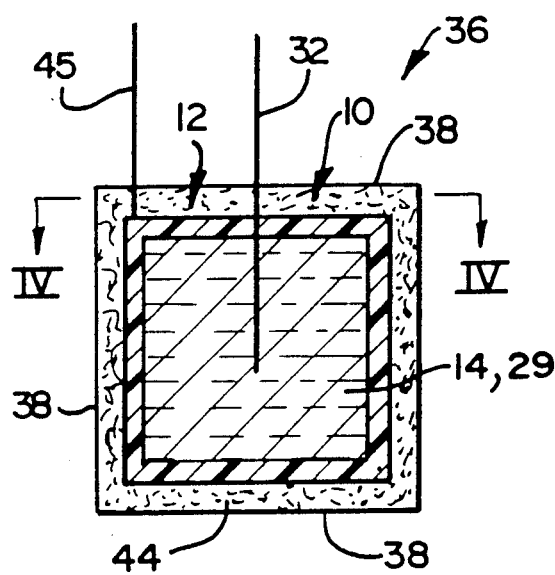
FIG. 5 shows a sectional end elevation of the battery of FIG. 4, in the direction of line V—V in FIG. 4.

Turning now to FIGS. 4 and 5, an electrochemical cell in accordance with the invention is generally designated 36. Unless otherwise specified, the same reference numerals are used in FIGS. 4 and 5, as are used in FIGS. 1 to 3.

FIGS. 4 and 5 are schematic representations of the cell, and the cell 36 is shown having an elongate rectangular mild steel housing in the form of a box 38 having a floor, roof, elongate rectangular side walls, and end walls, the end walls having substantially the same outline as the panels 16 of the anode 10 of FIGS. 1 to 3, i.e. roughly square in this example.

In the housing 38, a plurality (three) anodes 10 are shown arranged in opposed face-to-face relationship in series, their major faces 18 being parallel and spaced from one another, and parallel to the end walls of the housing 38. Between the anodes 10 are provided, alternating therewith, a plurality of cathode structures 40, 42. Two structures 40 are shown between the anodes 10, and a structure 42 is shown at each end of the series, longitudinally outwardly of the adjacent outermost anode 10. The cathode structures 42 are roughly half the thickness in the longitudinal direction of the housing 38, as the structures 40.

Each structure 40, 42 is in the form of an electronically conductive electrolyte-permeable porous unitary solid matrix saturated with liquid electrolyte. Each structure 40, 42 is, similar to the anodes 10, laterally flattened and rectangular in shape, having a pair of oppositely outwardly facing major faces whose edges are joined by edge faces. The structures 40, 42 have substantially the same size and outline as regards their major faces, as the anodes 10, and are aligned in register therewith, when the housing 38 is viewed in end elevation [see FIG. 5].

It should be appreciated, for ease of illustration, the anodes 10 in FIG. 4 are shown spaced from the structures 40, 42. In practice, for volumetric energy density considerations, however, the anodes 10 will usually be in abutment with and hard up against the structures 40, 42.

The structures 40, 42 in this example are each in the form of a porous iron matrix, (although the matrix may be Ni, Cr, Co, Mn, or Cu or some other suitable electronically conductive material such as another transition metal or carbon) and each matrix, in the charged state of the cell, has $FeCl_2$ dispersed throughout its porous interior, in fine particulate or thin layer form, together with a minor amount of dispersed solid NaCl.

Each structure 40, 42 is impregnated to saturation with an $NaAlCl_4$ molten salt liquid electrolyte which is liquid at the operating temperature of the cell 36. The electrolyte is stoichiometrically exact $NaAlCl_4$, so that in the fully charged state of the cell the mole ratio between the number of Al and Na cations is unity, i.e. the Al:Na mole ratio is 1:1.

The housing 38 is filled with the molten salt electrolyte which impregnates the structures 40, 42 so that said structures 40, 42 are immersed therein, as are the anodes 10. The electrolyte is shown in shown in FIGS. 4 and 5 at 44.

Each structure 40, 42 has a cathode collector 45 which projects upwardly therefrom through the electrolyte 44, being in electronic contact with the matrix of the structure 40, 42 and passing upwardly through the roof of the housing 38 in electronic contact therewith. The current collectors 32 of the anodes 10, are however insulated electrically from the electrolyte 44 and housing 38, but also project upwardly through the roof of said housing. The current collectors 32 are connected in parallel, and the current collectors 45 are also connected in parallel, so that they together respectively form the anode (negative) terminal and the cathode (positive) terminal of the cell.

It will be appreciated that the amount of active $FeCl_2$ cathode substance in the structures 40, 42 will be matched against and balanced with the amount of sodium 14 in the anodes 10. Each anode 10 has sufficient sodium 14 to discharge the $FeCl_2$ in a cathode structure 40, and each cathode structure 42 has sufficient $FeCl_2$ to discharge half the sodium in an anode 10. In this fashion each anode 10 and structure 40 can be charged and discharged through both of its major faces, but the structures 42 can only discharge efficiently through one major face thereof, in the direction of the adjacent anode 10.

It will be appreciated that, if desired, the rectangular respective outline and section (FIGS. 3 and 5) of the anode 10 and cell 36 may be replaced e.g. by a hexagonal section or by a rectangular section, and indeed a circular section may be employed, although this has disadvantages in close packing of cells for volumetric energy density considerations in batteries.

Furthermore, it will be appreciated that the cell 36 can easily be converted into a battery, simply by having a plurality of insulating panels or partitions (not shown), parallel to its end walls, dividing its interior into a plurality of chambers. In this case each chamber can contain an anode 10, and a structure 40. Instead, each compartment may contain a pair of structures 42, on opposite sides of the anode 10. The partitions may e.g. be of alpha-alumina, and in this case the cells may be connected in series, parallel or series/parallel as desired.

It should be noted that the structures 40, 42 may be of sintered or pressed powder construction, and indeed may be replaced by beds or layers of granules or powders of the electronically conducting material, having said $FeCl_2$ and NaCl dispersed therein. Combinations of these options are possible.

Furthermore, the cathode structures 40, 42 and electrolyte 44 can, if desired, be replaced by sulphur/sodium sulphide/sodium polysulphide catholyte, which merely occupies the spaces between the anodes 10 in the housing 38.

Figure 6:
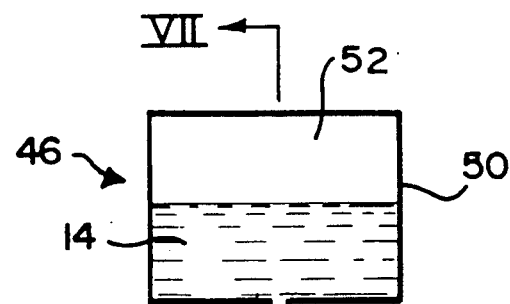
FIG. 6 shows a schematic view similar to FIG. 3 of another anode according to the invention in the direction of line VI—VI in FIG. 7.
Figure 6:
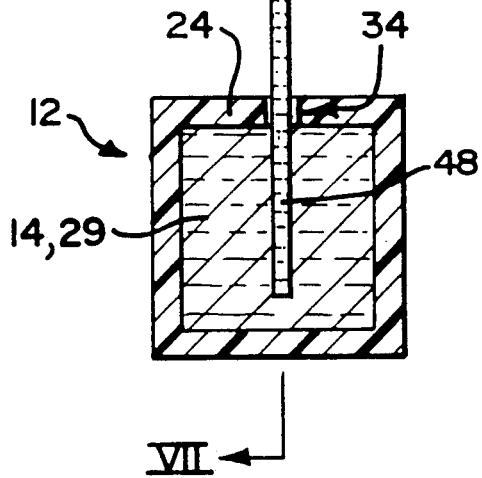
Figure 7:
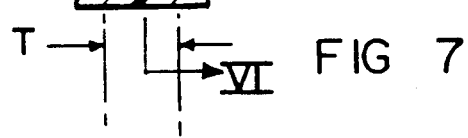
FIG. 7 shows a view similar to FIG. 1 of the cell of FIG. 6, in the direction of line VII—VII in FIG. 6.

Turning to FIGS. 6 and 7, a variation of the anode 10 of FIGS. 1 to 3 is generally designated 46. Once again, unless otherwise specified, like reference numerals refer to like parts.

In FIGS. 6 and 7, the holder 12 is substantially identical to that of FIGS. 1 to 3, but the anode 46 is of simple design, the interior space of the holder being empty apart from the sodium 14, the porous unitary matrix material 29 bonded to the wall of the housing and in which the sodium is impregnated, and a current collector in the form of a hollow tubular mild steel pipe 48 projecting downwardly through the upper wall 24 to which it is sealed as at 34, the pipe 48 communicating with the interior of the holder 12. The upper end of the tube or pipe 48 communicates with the floor of a mild steel reservoir 50, external to and separate from the holder, which is partially filled with sodium 14, and has a gas space 52 above the sodium filled with an inert gas such as argon at a suitable pressure which may be subatmospheric. The envelope of the holder 12 and the reservoir thus together form an enclosure containing said inert gas 52.

Once again, the walls or shell of the holder 12 should be as thin as possible consistent with strength and durability, as should be the thickness T of the interior space of the holder 12, between the opposed inwardly directed major surfaces of the panels 18.

It will be appreciated that, in use, as the anode 46 is charged and discharged, the interior space of the holder 12 will remain completely filled with sodium 14 at all times, but the level of the sodium 14 in the reservoir 50 will rise during charging, and will drop during discharging. The construction shown in FIGS. 6 and 7 has the advantage that a simple construction is possible, with no complex current collectors, wicks, or surface treatment to promote wetting of the interior surface of the holder 12 by the sodium 14, but a penalty is paid in terms of volumetric energy density, by the presence of the reservoirs 50.

With regard to the anodes and cell shown in FIGS. 1 to 7, it will be appreciated that the cells may be loaded in their discharged state, with the interior spaces of the holders 12 substantially empty or containing only a small starting amount of sodium, the cathode structures 40, 42 also being in their discharged state comprising essentially metallic iron with NaCl dispersed therein. Indeed, the cathode may be loaded in its over discharged state, containing also suitable proportions of aluminium metal together with the iron, sodium chloride and $NaAlCL_4$ electrolyte. Subjecting the cell to a charge cycle then forms the sodium 14 in the anode 10, converting the cathode materials into their charged state and consuming any aluminium present, so that the anode 10 can be loaded in its discharged, empty condition, without any sodium or with only a small starting amount of sodium therein.

Figure 8:
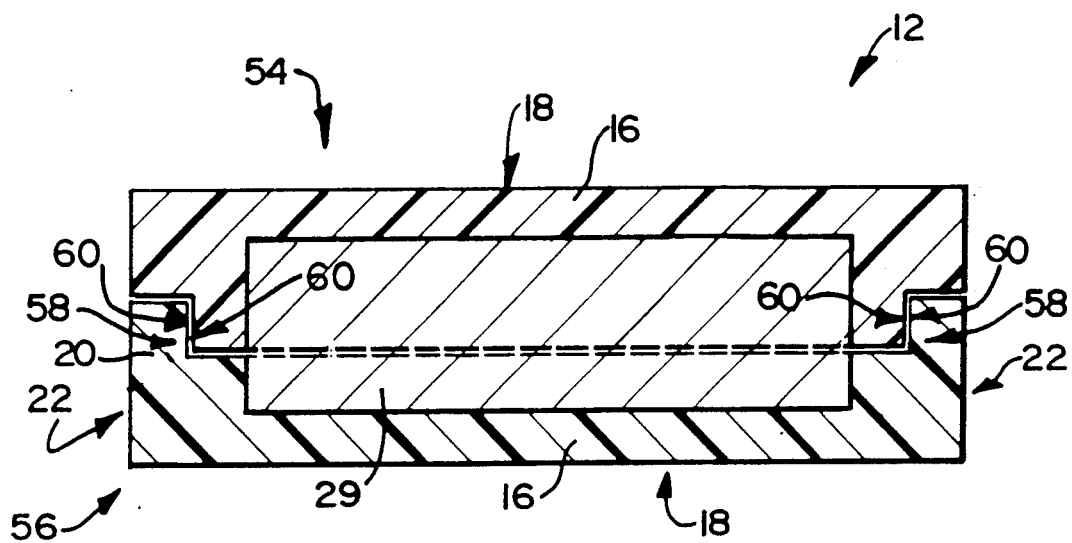
FIG. 8 shows a view corresponding to FIG. 2 of the anode of FIG. 1, during a method of making thereof according to the invention.
Figure 9:
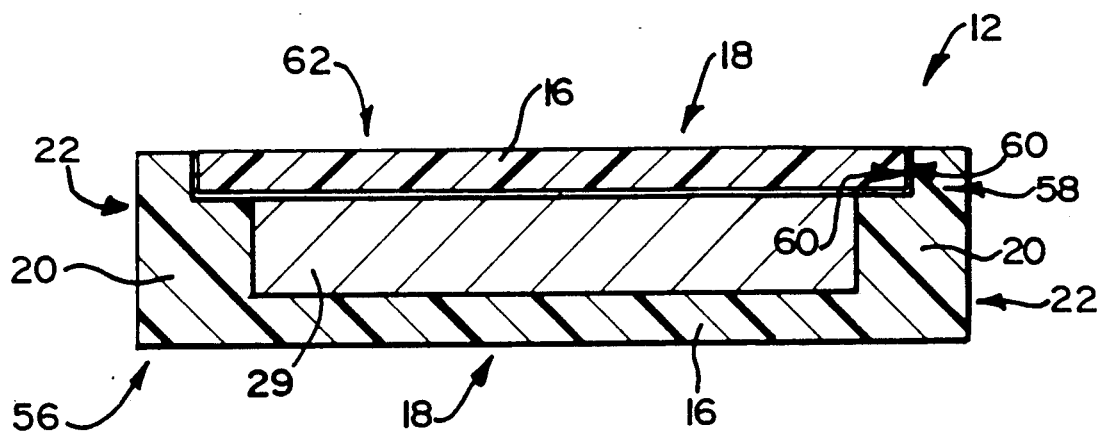
FIG. 9 shows a view similar to FIG. 8 of said anode during a variation of said method of making the anode.
Figure 10:
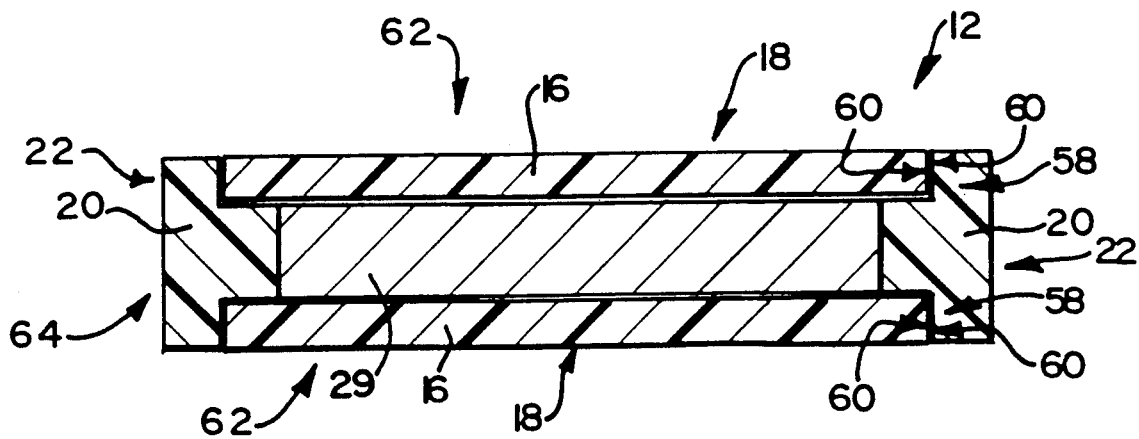
FIG. 10 shows a further view similar to FIG. 8 of said anode during a further variation of said method of making it.

Turning to FIGS. 8 to 10, in each case a holder 12 is shown in sectional plan view, the same reference numerals being used for the same parts as in FIGS. 1 to 3.

In FIG. 8 the holder is shown during construction thereof, and comprising two envelope portions 54, 56. Each portion 54, 56 is a panel portion, the portions having major surfaces 18 of substantially the same area and having the same peripheral outline. This peripheral outline may be square as shown in FIGS. 1 to 3, circular, hexagonal or the like. The portion 54 is an inner portion and the portion 56 is an outer portion.

Each of the portions 54, 56 has a peripheral rim projecting towards the other portion, and provided with complementary rebates shown engaging at 58. Where the rebates engage at 58 the outer portion 56 embraces the inner portion 54, via complementary sealing surfaces at 60, the inner portion 54 fitting spigot/socket fashion into the outer portion 56, so that the rims of the portions 54, 56 close off the peripheral edges of the interior space of the holder 12.

In FIG. 9 there is a similar construction, and like reference numerals again refer to like parts, except that in this case the inner portion is a flat plate 62 with no peripheral rim.

Turning to FIG. 10, there are two inner portions 62 of the same type as shown in FIG. 9, and a T-section outer portion, designated 64, which embraces the outer peripheries of both plates 62 at its rebates 58 via sealing surfaces at 60. Naturally the portions 62 could instead be cup shaped outer socket portions, the portion 64 being a hollow cylindrical inner spigot portion.

In use, the various portions 54, 56, 62, 64 will be pressed from suitable powders which are precursors of beta''-alumina and which shrink to form beta''-alumina upon firing and sintering. In each case the material of the inner portion (54 or 62 as the case may be) is selected or prepared so that it exhibits less shrinkage upon firing than the outer portion (56 or 64 as the case may be), and so that there is a limited clearance of e.g. less than 0.1 mm between the sealing surfaces at 60.

The inner and outer portions are arranged to form envelopes for the holders 12 shown by the respective assemblies in FIGS. 8 to 10, and are then fired to sinter the portions and to convert the material to beta''-alumina. During this firing, the portions shrink, and because the outer portions shrink to a greater degree than the inner portions, hermetic seals are formed between the sealing surfaces at 60. Formation of these hermetic seals is facilitated and promoted by plasticity of the materials in question at certain temperatures during the firing, which leads to physical and/or chemical bonding between the portions.

During or after arranging the portions to form the envelopes, matrix material 29 can be loaded into the interiors of the holders 12, to be bonded to the envelope during firing, and if the material is e.g. a particulate precursor of the matrix, to form the matrix during the firing. Wicking material, current collectors, reinforcing elements etc (see 27, 32 and 35 in FIGS. 1 to 3) can also be provided in place while the portions are arranged into the assemblies, prior to firing.

The Applicant has carried out various preliminary tests to show the feasibility of the method. For these tests, starting powders were prepared having different shrinkages upon firing, as follows:

Powder 1

This powder was prepared by spray drying a wet milled (by a vibro-energy mill) mixture containing 50% by mass solids in water of Cera Hydrate boehmite, obtained from B A Chemicals Plc, Gerrrards Cross, Buckinghamshire, England. This boehmite had been calcined to a temperature of 700° C. before wet milling. Lithia and soda were added thereto, to provide a lithia content of 0.72% by mass and a soda content of 9.55% by mass. This powder exhibited, upon firing to beta"-alumina, a linear size reduction of 28-31% with respect to its linear dimensions after firing.

Powder 2

This powder was prepared in a substantially similar way to Powder 1 with wet milling and spray drying, with the substantial difference that 30% by mass of the boehmite was replaced by an alpha-alumina prior to calcining, the alpha-alumina being that available from Alcoa (Great Britain) Limited, Droitwich, Great Britain, under the trade designation A-16 SG. The lithia content of the powder was 0.71% by mass, and the soda content was 9.1% by mass. This powder exhibited a shrinkage upon firing of 24–27.5% with respect to the linear dimensions of the fired product Powder 3

This powder was prepared from the same boehmite as Powder 1 in an essentially similar fashion, except that, after spray-drying, the spray-dried powder was fired to 1250° C. for a period of 1 hour to convert the powder to beta"-alumina. The fired beta"-alumina powder was then again wet-milled with water at a 50% by mass solids content and again spray-dried prior to pressing. In this case the lithia content was 0.7% by mass and the soda content of 9.0% by mass, and the powder exhibited a linear shrinkage upon firing of 19-22.5%, based on the dimensions after firing.

Powder 4

In this case the starting powder was pure Alcoa A-16 SG alpha-alumina. It was prepared in a similar fashion to Powders 1 and 2, having a lithia content of 0.7% by mass and a soda content of 9.1% by mass.

It should be noted that all of Powders 1 to 4 were materials of a particle size of less than 45 microns, and that the lithia and soda contents were given on a dry basis in each case, with the balance of the powder in each case being $Al_2O_3$.

Preliminary tests were carried out to establish what effect the isostatic pressure used to press the powder into tubes had on the ultimate density of the tubes and on the shrinkage exhibited during firing by the tubes. Results are set out in the following table, Table 1.

TABLE 1

| Pressing Pressure (mPa) | Powder Number | Fired Density (g/cm$^3$) | Fired Shrinkage (% with respect to linear dimensions of fired tube) |
|---|---|---|---|
| 70 | 2 | 3,106 | 31,50 |
|  | 3 | 3,176 | 26,77 |
| 105 | 2 | 3,188 | 31,37 |
|  | 3 | 3,206 | 25,90 |
| 140 | 2 | 3,191 | 29,62 |
|  | 3 | 3,211 | 24,86 |
| 175 | 2 | 3,193 | 28,73 |
|  | 3 | 3,203 | 23,22 |
| 203 | 2 | 3,200 | 28,03 |
|  | 3 | 3,199 | 22,83 |
| 238 | 2 | 3,203 | 27,41 |
|  | 3 | 3,203 | 22,06 |

The Applicant has carried out various successful tests on these powders, whereby tube portions, when arranged spigot/socket fashion with rebates and sealing surfaces similar to those shown at 58 and 60 in FIG. 8, were successfully hermetically sealed together during firing. This indicates that the holder portions shown in FIGS. 8 to 10 should seal together hermetically with no difficulty provided that the spacing at the sealing surfaces is sufficiently small, bearing in mind the size (e.g. diameter) of the portions. Details of the tests carried out on the tubes are described in the Applicant's co-pending British Patent Application 8823364.8, which corresponds with U.S. patent application Ser. No. 252,500 filed Sept. 30, 1988.

Naturally, the portions can be pressed to provide a suitable opening, e.g. through an edge wall of the holder, for charging sodium, insertion of a current collector or the like. When in position, this current collector may be sealed in place, by glass welding, brazing, thermocompression bonding or the like. Indeed, a current collector may be placed in position with the portions in their green state, and sealed into place in the opening by the sintering. Porous preformed matrixes or powder precursors for porous matrixes will be located in position in the interior space of the holder 12 before the sintering, and the firing will bond the preformed matrix, if used, to the walls of the holder or will sinter a powder, if used, into a unitary matrix while bonding it to the wall of the holder.

Although in the aforegoing the anode of the present invention has been described and defined as employing a holder which contains a unitary porous matrix which is permeable by the molten alkali metal of the anode and which is bonded to the inner surface of the wall of the holder, it will be appreciated that this matrix, while desirable, is not essential for purposes of utility. Furthermore, the anode of the invention is believed to have substantial novelty and utility without this matrix.

Accordingly, the invention extends to an anode for a high temperature rechargeable electrochemical power storage cell which comprises a holder which contains an alkali metal active anode substance which is molten at the operating temperature of the cell for which it is intended, the holder being in the form of a ceramic envelope having a continuous wall made of a solid electrolyte conductor of ions of the active alkali metal anode substance and having an electronically conductive current collector in contact with the alkali metal and projecting through a sealed opening in the wall of the holder to the exterior thereof.

In this case it is contemplated that structural elements as described above, such as spacers or baffles, may be contained in the interior space of the holder; and a layer of wicking material as described above, such as a layer of fibres or particles, may still be bonded to the inner surface of the holder wall of shell. Furthermore, the inner surface of the wall or shell may still be treated, e.g. with a transition metal oxide, as described above to enhance its wettability; and the interior space of the holder may contain, in addition to a metal rod, wire or post current collector, a mesh, gauze or grid-type current collector held up against the inner surface of the wall of shell, in contact therewith at a multiplicity of positions as described above.

We claim:

1. An anode for a high temperature rechargeable electrochemical power storage cell, the anode comprising a holder which contains an alkali metal active anode substance which is molten at the operating temperature of the cell for which it is intended, the holder comprising a ceramic envelope having a continuous wall made of a solid electrolyte conductor of ions of the active alkali metal anode substance and the holder having an electronically conductive current collector in contact with the alkali metal and projecting through an opening in the wall of the envelope to the exterior thereof, the interior of the envelope containing a unitary porous solid matrix which is permeable by and impregnated by the molten alkali metal and which is bonded to at least part of the inner surface of the wall of the envelope.

2. An anode as claimed in claim 1, in which the envelope is of flattened shape, having a pair of oppositely outwardly facing major outer faces interconnected by at least one outwardly facing peripheral edge face, the current collector projecting through a said edge face into the holder, and being sealed in the opening through which it projects.

3. An anode as claimed in claim 1, in which the envelope is prismatic in shape, having a cross-section normal to its axis whereby a multiplicity of like anodes can be arranged side-by-side in a close packed arrangement.

4. An anode as claimed in claim in which the holder comprises at least one reinforcing element in the interior of the envelope in contact with and spacing apart portions of the envelope, whereby the envelope is reinforced.

5. An anode as claimed in claim 1, in which at least part of the inner surface of the envelope is lined by a lining of wicking material, for wicking the sodium into contact with said inner surface.

6. An anode as claimed in claim in which the current collector comprises an electrolyte-permeable layer lining at least part of the inner surface of the envelope.

7. An anode as claimed in claim 1, in which the interior of the envelope forms at least part of an enclosure which contains an inert gas.

8. An anode as claimed in claim 1, in which the current collector, where it passes through the wall of the envelope, is hollow and tubular, the anode including an external closed storage reservoir for molten alkali metal anode substance, the reservoir being separate from the envelope and connected to and in communication with the interior of the envelope via the current collector.

9. An anode as claimed in claim 1, in which the alkali metal of the anode is sodium, the material of the envelope being selected from the group consisting of beta-alumina, beta''-alumina and nasicon.

10. A holder for an anode as claimed in claim 1, the holder comprising a ceramic envelope having a continuous wall made of a solid electrolyte conductor of alkali metal ions and the holder having an electronically conductive current collector projecting through an opening in the wall of the envelope so that it leads from the interior of the envelope to the exterior thereof, the interior of the envelope containing a unitary porous matrix which is permeable by and impregnatable by molten alkali metal, the matrix being bonded to at least part of the inner surface of the wall of the envelope.

11. A holder as claimed in claim 10, in which the envelope is of flattened shape, having a pair of oppositely outwardly facing major outer faces interconnected by at least one outwardly facing peripheral edge face, the current collector projecting through a said edge face into the holder, and being sealed in the opening through which it projects.

12. A holder as claimed in claim 10, in which the envelope is prismatic in shape, having a cross-section normal to its axis whereby a multiplicity of like anodes can be arranged side-by-side in a close packed arrangement.

13. A holder as claimed in claim 10, in which the holder comprises at least one reinforcing element in the interior of the envelope in contact with and spacing apart portions of the envelope, whereby the envelope is reinforced.

14. A holder as claimed in claim 10, in which at least part of the inner surface of the envelope is lined by a lining of wicking material, for wicking sodium into contact with said inner surface.

15. A holder as claimed in claim 10, in which the current collector comprises an electrolyte-permeable layer lining at least part of the inner surface of the envelope.

16. A holder as claimed in claim 10, in which the interior of the envelope forms at least part of an enclosure which contains an inert gas.

17. A holder as claimed in claim 10, in which the current collector, where it passes through the wall of the envelope, is hollow and tubular, the anode including an external closed storage reservoir for molten alkali metal anode substance, the reservoir being separate from the envelope and connected to and in communication with the interior of the envelope via the current collector.

18. A holder as claimed in claim 10, in which the material of the envelope is selected from the group consisting of beta-alumina, beta''-alumina and nasicon.

19. A high temperature rechargeable electrochemical power storage cell which comprises an anode as claimed in claim 1, and a cell housing having an interior defining a cathode compartment in which the anode is located, an active cathode substance being located in the cathode compartment outside the envelope and electrochemically coupled to the anode.

20. A cell as claimed in claim 19, in which there are a plurality of anodes, connected in parallel and located in the cathode compartment.

21. A cell as claimed in claim 19, in which the active cathode substance is provided by a catholyte electrochemically coupled to each anode.

22. A cell as claimed in claim 19, in which the active cathode substance is in solid form, being electrochemically coupled to each anode by a liquid electrolyte in the cathode compartment.

23. A method of making an anode as claimed in claim 1 or a holder as claimed in claim 10, which method comprises the steps of:

pressing at least two portions of the envelope to have shapes whereby said portions can be arranged together to form the envelope, from a powder which, when pressed and then sintered, shrinks to form an integral ceramic solid electrolyte artifact;

arranging the portions together to form an arrangement which provides the envelope, the portions in the arrangement being arranged so that each portion is in contact with at least one other portion to form a pair in which one portion is an inner portion and the other portion is an outer portion which surrounds and embraces a outer periphery of the inner portion;

loading matrix material into the interior of the envelope;

sintering the arrangement to cause the portions to shrink while they are converted into integral solid ceramic artifacts, the inner and outer portion of each pair being made so that the outer portion of the pair undergoes a greater degree of shrinkage during sintering than the associated inner portion, and shrinks on to the periphery of the inner portion which it embraces, to cause said inner and outer portions to seal together hermetically to form an integral ceramic envelope, and to cause the matrix material to become bonded to at least part of the inner surface of the envelope in the form of a unitary porous solid matrix which is permeable to molten alkali metal; and when an anode is made, impregnating the unitary porous solid matrix with a molten alkali metal.

24. A method as claimed in claim 23, in which at most three portions are pressed to have shapes whereby they can be arranged together to form the envelope so that the envelope has a flattened shape, two of the portions comprising panel portions having major faces of the same area and peripheral outline, the portions being arranged so that the panel portions are opposed face-to-face with each other and are spaced from each other, the panel portions providing the envelope with a pair of oppositely outwardly facing major faces.

25. A method as claimed in claim 23, in which the powder from which the portions are pressed is selected so that, upon sintering, the ceramic into which said portions is converted is a member of the group consisting of beta-alumina, beta''-alumina and nasicon.

26. A method as claimed in claim 23, in which portions are formed so that, after they are arranged to form the envelope, the spacing between inner and outer portions of each said pair where they seal together on firing is at most 0.1 mm, and so that, upon firing, each outer portion of a said pair undergoes a percentage linear reduction in size which is greater by at least 1% than the percentage linear reduction in size which each associated inner portion undergoes, based respectively on the shrunken sizes of the portions.

27. A method as claimed in claim 23, in which the pressing is to a pressure 70-280 MPa, the sintering being to a temperature of 1500°-1650° C.

28. A method as claimed in claim 23, which comprises the step of, before the sintering, loading the interior of the envelope with a particulate matrix precursor material, which, when sintering to form the integral envelope takes place, forms the unitary porous matrix which is bonded to the envelope.

* * * * *

UNITED STATES PATENT AND TRADEMARK OFFICE
CERTIFICATE OF CORRECTION

PATENT NO. : 5,061,580

DATED : October 29, 1991

INVENTOR(S) : Wedlake, et al

It is certified that error appears in the above-identified patent and that said Letters Patent is hereby corrected as shown below:

Col. 19, line 43, after "claim" insert --1,--.
line 52, after "claim" insert --1,--.

Signed and Sealed this

Twenty-seventh Day of April, 1993

Attest:

MICHAEL K. KIRK

*Attesting Officer*    Acting Commissioner of Patents and Trademarks